United States Patent [19]

Kaufman

[11] 3,819,555
[45] June 25, 1974

[54] VINYLAMIDE-ACROLEIN POLYMERS AND PAPER OF IMPROVED STRENGTH HAVING A CONTENT THEREOF
[75] Inventor: Ernest D. Kaufman, Stamford, Conn.
[73] Assignee: American Cyanamid Company, Stamford, Conn.
[22] Filed: Dec. 23, 1971
[21] Appl. No.: 211,633

[52] U.S. Cl.... 260/29.4 UA, 162/168, 260/29.6 TA, 260/72 R
[51] Int. Cl.......................... C08g 9/20, C08g 51/24
[58] Field of Search... 260/29.6 TA, 29.4 UA, 72 R; 162/168

[56] References Cited
UNITED STATES PATENTS
2,416,536  2/1947  Neher et al. ........................... 260/73
3,556,932  1/1971  Coscia et al. ......................... 162/166

Primary Examiner—Melvin Goldstein
Assistant Examiner—W. C. Danison
Attorney, Agent, or Firm—Evans Kahn

[57] ABSTRACT

Polymers consisting essentially of a major proportion of vinylamide linkages and a minor proportion of acrolein linkages are self-substantive to cellulose fibers in aqueous suspension and provide good dry strength. If desired, the polymers may carry anionic substituents, cationic substituents, or both, in which event the affinity of the polymers for the cellulose fibers is improved. Furthermore, if desired, the polymers may contain thermosetting substituents in which event the polymer possesses wet-strengthening properties in addition to providing dry strength. The polymers are specially useful in the manufacture of paper from unbleached fibers and from pulps which contain black liquor.

7 Claims, No Drawings

VINYLAMIDE-ACROLEIN POLYMERS AND PAPER OF IMPROVED STRENGTH HAVING A CONTENT THEREOF

The present invention relates to vinylamide polymers useful in the manufacture of paper of improved dry and if desired wet strength. The invention includes the polymers themselves, paper containing the polymers as strengthening agents, and processes for the manufacture of the polymer and the paper.

The discovery has been made that vinyl polymers which contain a substantial proportion of acrylamide linkages and acrolein linkages having the respective formulae:

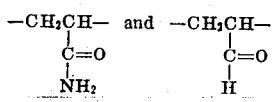

in proportions such that the polymers are in hydrophilic-hydrophobic balance (i.e., so that they are substantially autodispersible in water as is more particularly described below) is adsorbed by cellulose papermaking fibers in aqueous suspension, and posses the property of imparting dry strength to paper composed of fibers having a uniformly adsorbed content of these polymers.

The further discoveries have been made that the polymers of the present invention (even when non-ionic) are substantively adsorbed by cellulose fibers in aqueous suspensions having pH values within the normal papermaking range of 4 to 9 and that when carrying substantially no thermosetting linkages, they act as agents which impart dry strength only, even when the wet webs are dried at elevated temperature as is customary.

It has further been found that the polymers may carry thermosetting substituents, and that the resulting polymers confer wet strength, in addition to dry strength.

A further benefit of the present discovery is that it permits non-ionic vinylamide dry strength polymers to be made by solution polymerization methods. Such methods do not require the use of emulsifying agents or provisions for vigorous agitation of the reaction mixture.

More in detail, the polymers of the present invention contain at least 60 weight percent acrylamide linkages and at least 5 weight percent of acrolein linkages, the proportion of these linkages in the polymer being such that the polymer is substantially autodispersible in water. A polymer is autodispersible in water when it disperses itself in water when allowed to stand therewith at room or at elevated temperature forming a stable dispersion which does not cream or settle out when the dispersion is allowed to stand at least for a few days. A polymer is substantially autodispersible when it is dispersed by the action of gentle agitation with formation of a similar dispersion. The acrylamide linkages are hydrophilic, and the acrolein linkages are hydrophobic.

The presence of dispersed particles in the water can be demonstrated by viewing the dispersion across a beam of transmitted light. The beam becomes visible by the Tyndall effect.

When the proportion of acrolein is at the lower end of the range, the dispersion tends to be hazy and moderately transparent, and becomes milky and opaque when the proportion of acrolein is at the upper end of the range. Too large a proportion of acrolein renders the polymers indispersible in water even at the boil. Within the range, the acrolein causes the polymer to be adsorbed by cellulose fibers in aqueous suspension in the pH range 4–9.

The ratio of acrylamide to acrolein linkages in the polymer of the present invention lies within the molar ratio range of about 95:5 and 75:25. The optimum ratio may vary from instance to instance depending on the type of fiber present, but can readily be found by laboratory trial.

If desired, the polymers may contain anionic or cationic linkages or both, rendering the polymer as a whole cationic or anionic at the pH of the fibrous suspension to which they are added. These linkages at appropriate pH supplement the action of the acrolein linkages in causing deposition of the polymers on the fibers.

The minimum proportion in which either of these ionic linkages can advantageously be present is about 2 weight percent, as below this amount the linkages produce only a virtually negligible effect. On the other hand the proportion of these linkages may be as high as 20 weight percent. In practice, it is preferred that when ionic linkages are present they be present in the range of about 5 and 15 weight percent, as in this range the ionic linkages make a substantial improvement in the substantivity of the polymers (particularly when they are applied to bleached fibers) and the proportion of acrylamide linkages (the primary dry strengthening component of the polymers) remains at a high level, so that the polymers possess high strengthening properties.

If desired, the polymers may contain both cationic and anionic linkages. In this event, the polymers are amphoteric and possess the combined benefits of polymers which contain only one ionic linkage or the other.

The acrolein linkages of the polymers of the present invention provide at most only a negligible amount of wet strength. However, the polymers can readily be modified to provide them with very satisfactory wet-strengthening properties. This can be done by including thermosetting linkages in the chain. A large number of such linkages are known. I prefer to render the polymers thermosetting by glyoxalating a portion of the amide linkages of polymers, for example, by reacting one-fourth to one-half of the amide substituents of the polymers with glyoxal to the extent of one of the functionalities of the glyoxal. The resulting polymers which may be substantially non-ionic, are substantively adsorbed by cellulose fibers in aqueous suspension and impart excellent wet strength when the paper is dried at temperatures in excess of 190° F., the polymer being thermosetting. Preferably the starting polymer has a low molecular weight as the thermosetting substituents form cross-linkages with passage of time, causing the polymer to advance to the gel point more rapidly than would otherwise be the case.

The polymers of the present invention, if desired, may contain a minor amount of such other linkages as are present in hydrophobic-hydrophilic dry strengthening polymers. Such linkages include styrene, vinylnaphthalene, butyl acrylate and dimethylaminoethyl acrylate, and are introduced by including them in appropriate proportion in the mixture of monomers from which the polymers of the present invention are prepared. They act to complement the substantivity imparted by the acrolein linkages. Moreover, they may contain substantially inert linkages, for example, N,N-dimethylacrylamide linkages and N-(2-hydroxyethyl)acrylamide linkages.

The polymers of the present invention are conveniently prepared by adding a vinyl polymerization catalyst to an oxygen-free aqueous solution of acrylamide containing the desired amount of acrolein and, if desired, other comonomers and maintaining the solution at a suitable temperature (e.g., 70°–80° C.) with exclusion of oxygen until polymerization has come to a substantial halt. Sufficient water is preferably present so that the product is a syrup of pumpable viscosity.

If desired, the syrup may be evaporated to dryness and the residue (the polymer) can be ground to free-flowing particulate state. Alternatively, the polymer can be recovered in dry state by extruding the syrup into anhydrous methanol which causes the polymer to precipitate. The polymer redisperses on gentle agitation with water, forming a hazy dispersion therein.

For the manufacture of paper the polymer solution is advantageously diluted to 1–10 percent solids with water to facilitate metering and uniform distribution of the polymer through the pulp.

Paper according to the present invention is manufactured by forming an aqueous suspension of cellulose papermaking fibers, adding thereto an effective amount of a polymer of the present invention as strengthening agent, forming the fibers into a web, and drying the web.

When no thermosetting component is present, the polymers provide substantially no wet strength even when the wet web is dried at temperatures in excess of 190° F. This is about the minimum temperature at which wet webs are dried in commercial practice.

The polymers of the present invention provide good results with pulps in the pH range of 4–9. The non-ionic and cationic polymers provide good results when added to pulps composed of unbleached fibers (which may contain alum), and to pulps which have a content of black liquor solids. The non-ionic and anionic polymers provide good results when added to pulps composed of fibers which have previously been rosin sized. Moreover, the cationic polymers are advantageously employed for the treatment of pulps where superior polymer retention at an acid pH is desired. Furthermore, the anionic polymers are specially useful in the treatment of a pulp having a pH of 4–6 composed of unbleached kraft fibers which have previously been sized with rosin size or other soap size.

The polymer solution is added in customary amount, i.e., in amount sufficient to supply about 0.1 to 3 percent of the polymer solution based on the weight of the fibers. The solution is most advantageously added as near as possible to the fourdrinier wire, i.e., at the fan pump or headbox. Adsorption of the polymer occurs in the brief time the fibers travel from the place of addition to the wire.

The invention is further described in the examples which follow. These examples are preferred embodiments of the invention and are not to be construed in limitation thereof.

In the claims, the term "moiety" is used as a synonym for the term "linkage" in the specification.

EXAMPLE 1

The following illustrates the preparation of a polymer according to the present invention, showing the effect of variations in the vinylamide:acrolein ratio.

Polymer A

To 500 cc. of oxygen-free water under a nitrogen blanket are added 63.0 g. (0.95 mol) of acrylamide, 2.75 g. of acrolein (0.05 mol), and 0.33 g. of ammonium persulfate catalyst. The mixture is stirred until uniform and is then allowed to stand for 12 hours at 75° C. The product is a hazy viscous syrup which contains 13.5 percent by weight of an approximately 95:5 molar ratio acrylamide:acrolein polymer. It does not cream or separate into two layers on standing. The syrup is readily diluted to 10 percent solids with water. The resulting solution exhibits a pronounced Tyndall effect when a beam of light is passed transversely through the sample in the dark. The sample remains stable for at least 2 weeks at 40° C. and pH 3.5. A sample of the syrup in a beaker is dried to a solid deposit. The deposit redisperses itself when water is added and the beaker is allowed to stand overnight at 25° C.

Polymer B and C

The procedure for the preparation of polymer A is repeated except that the acrylamide:acrolein ratio is varied so as to produce an 85:15 molar ratio copolymer (polymer B) and a 75:25 molar ratio copolymer (polymer C).

Polymer B as prepared is a viscous syrup which resembles polymer A syrup, except that it is more hazy.

Polymer C precipitates from solution as fast as it is formed. The precipitate is a hard granular material which does not dissolve in water even at the boil, and is not within the present invention.

EXAMPLE 2

The following illustrates the manufacture of paper of substantially improved dry strength but of negligible wet strength by use of polymers according to the present invention.

An aqueous suspension of well-beaten unbleached southern kraft fibers is formed at 0.6 percent consistency and pH 6. Aliquots are taken and to these are added respectively amounts of polymer solutions A and B of Example 1 diluted to 1 percent solids by addition of water to provide the amounts of polymer shown in the table below. The suspensions are briefly stirred to effect uniform distribution of the polymer therethrough, after which the fibers are formed into a wet web at a basis weight of about 50 lb. per 25" × 40"/500 ream. The webs are pressed between blotters and the resulting wet webs are dried for 90 seconds on a rotary laboratory drum drier having a drum temperature of 240° F. The dry and wet strengths of the resulting handsheets are then determined.

Results are as follows:

| Run No | Polymer No. | Molar Ratio[1] | % Added[2] | Dry Found[3] Lb./in.$^2$ | % Incr. | Wet[4] Lb./in. |
|---|---|---|---|---|---|---|
| — | — | — | None | 85:2 | — | 0.6 |
| 1 | A | 99:5 | 0.25 | 86.2 | 1.2 | 0.6 |
| 2 | | | 0.5 | 100.3 | 17.7 | 1.0 |

-Continued

| Run No | Polymer No. | Polymer Molar Ratio[1] | % Added[2] | Paper Strength Dry Found[3] Lb./in.[2] | Paper Strength Dry % Incr. | Wet[4] Lb./in. |
|---|---|---|---|---|---|---|
| — | — | — | None | 85:2 | — | 0.6 |
| 3 | B | 85:15 | 0.25 | 93.6 | 9.9 | 1.3 |
| 4 | B | 85:15 | 0.5 | 103.6 | 21.6 | 1.8 |

[1]Acrylamide to acrolein.
[2]Based on dry weight of fibers.
[3]By Mullen test.
[4]By ASTM method.

EXAMPLE 3

The procedure for the manufacture of paper by the method of Example 1-B is repeated, except that 0.4 mol of glyoxal per mol of acrylamide in the polymer is added (as a 40 percent solution in water) to the 10 percent solution and the solution is allowed to age 1 hour at room temperature and pH 8 before it is added to the fibrous suspension.

The resulting paper possesses very good wet strength in addition to dry strength.

EXAMPLE 4

The following illustrates the preparation of the polymer of the present invention in dry particulate free-flowing state.

100 cc. of a 10 percent aqueous solution of polymer B of Example 1 is stirred into a liter of anhydrous methanol. A white precipitate forms which is recovered by suction filtration and allowed to air dry. The product is a coarse particulate material which is ball milled. A free-flowing powder is obtained. The powder autodisperses in 100 cc. of water at 25° C. and the starting solution is regenerated.

EXAMPLE 5

The procedure for the preparation of polymer B is Example 1 is repeated except that 0.9 g. of the acrolein is replaced by an equal weight of acrylonitrile. An 85:5:10 acrylamide:acrylonitrile:acrolein polymer is obtained which possesses good dry strengthening properties.

EXAMPLE 6

The following illustrates the preparation of an anionic polymer according to the present invention.

The procedure of Example 1 is repeated except that the amount of acrylamide is decreased to 69.9 g. and 3.5 g. of acrylic acid is added to the starting mixture. The resulting polymer contains about 5 mol percent of acrylic acid linkages.

EXAMPLE 7

The following illustrates the manufacture of paper of improved dry strength from a pulp which ordinarily is not benefited by vinylamide dry strength polymers.

The pulp used in an aqueous suspension of unbleached kraft fibers beaten to a Canadian standard freeness of 500 cc. The suspension has a fiber consistency of 0.6 percent and pH of 4.5, and contains 3 percent black liquor solids based on the dry weight of the fibers and 500 parts per million by weight of dissolved sulfate ions represented by sodium sulfate. The fibers are then sized by addition of 0.5 percent of a commercial fortified rosin size and 1 percent of alum. There is then added 0.5 percent based on the dry weight of the fibers of the polymer of Example 6 as a 1 percent solution, after which the suspension is stirred briefly to distribute the polymer among the fibers, after which the suspension is formed into paper by the method of Example 2. A paper of excellent dry strength is obtained.

Example 8

The following illustrates the preparation of a cationic polymer according to the present invention.

The process of Example 1 is repeated except that 3.5 g. of the acrylamide in the starting mixture is replaced by 8.3 g. of diallyl dimethyl ammonium chloride and the amount of catalyst is increased to 0.35 g. A polymer is obtained which contains 5 mol percent of cationic linkages.

EXAMPLE 9

The following illustrates the manufacture of paper by use of a cationic polymer according to the present invention.

To an aqueous suspension of bleached sulfite fibers is beaten to a Canadian standard freeness of 475 and diluted to 0.6 percent consistency. Two aliquots are taken. One aliquot is adjusted to pH 5 and the other to pH 8, and to each is added sufficient of a 1 percent solution of the polymer of Example 8 to supply 0.5 percent of the polymer based on the dry weight of the fibers. The aliquots are stirred briefly after which the fibers are processed into paper by the method of Example 2. The polymer provides about equal dry strength to both papers, but provides substantially no wet strength.

I claim:

1. A vinyl polymer useful as a dry strengthening agent in the manufacture of paper consisting essentially of at least 60 weight percent of acrylamide moieties, 2 to 20 weight percent of ionic moieties, and at least 5 weight percent of acrolein moieties, the proportion of said acrylamide and said acrolein moieties in said polymer being such that the polymer is substantially autodispersible in water.

2. A polymer according to claim 1 wherein the ionic moities are anionic moieties.

3. A polymer according to claim 1 wherein the ionic moieties are cationic moieties.

4. A polymer according to claim 1 wherein the acrylamide and acrolein moieties are within the molar range of about 95:5 and 80:20.

5. A polymer according claim 1 wherein at least some of the acrylamide moieties carry —CHOHCHO substituents as agents imparting wet strengthening properties to the polymer.

6. An aqueous dispersion of a polymer according to claim 1 having a pH in the range of about 3 to about 10.

7. A polymer according to claim 1 in apparently dry free-flowing particulate form.

* * * * *